(12) United States Patent
Lindström

(10) Patent No.: US 8,398,151 B2
(45) Date of Patent: Mar. 19, 2013

(54) DUMPER BODY

(75) Inventor: Bo Lindström, Jönäker (SE)

(73) Assignee: SSAB Technology AB, Stockholm (SE)

( * ) Notice: Subject to any disclaimer, the term of this patent is extended or adjusted under 35 U.S.C. 154(b) by 0 days.

(21) Appl. No.: 13/131,180

(22) PCT Filed: Nov. 25, 2009

(86) PCT No.: PCT/SE2009/051332
§ 371 (c)(1),
(2), (4) Date: May 25, 2011

(87) PCT Pub. No.: WO2010/062249
PCT Pub. Date: Jun. 3, 2010

(65) Prior Publication Data
US 2011/0227366 A1    Sep. 22, 2011

(30) Foreign Application Priority Data
Nov. 25, 2008 (SE) ................................. 0850095

(51) Int. Cl.
*B62D 33/02* (2006.01)
(52) U.S. Cl. ............................. 296/183.2; 298/7
(58) Field of Classification Search ............... 296/183.2; 298/7
See application file for complete search history.

(56) References Cited

U.S. PATENT DOCUMENTS

| | | | | |
|---|---|---|---|---|
| 2,490,532 A | * | 12/1949 | Maxon, Jr. ............... | 298/22 P |
| 3,578,375 A | * | 5/1971 | Finefrock ................. | 296/39.2 |
| 4,944,421 A | * | 7/1990 | Yurgevich ................. | 220/1.5 |
| 5,090,773 A | * | 2/1992 | Guillaume ................. | 298/17 R |
| 2004/0026959 A1 | | 2/2004 | Kostecki | |
| 2006/0080818 A1 | | 4/2006 | D'Amico et al. | |
| 2009/0127887 A1 | * | 5/2009 | Westner ................. | 296/183.2 |

FOREIGN PATENT DOCUMENTS

| | | |
|---|---|---|
| FR | 2 405 157 | 5/1979 |
| FR | 2 883 831 | 10/2006 |

OTHER PUBLICATIONS

International Search Report for PCT/SE2009/051332, mailed Mar. 10, 2010.
International Preliminary Report on Patentability for PCT/SE2009/051332, mailed Mar. 10, 2010.

* cited by examiner

*Primary Examiner* — Dennis Pedder
(74) *Attorney, Agent, or Firm* — Nixon & Vanderhye PC

(57) ABSTRACT

Dumper body (1) comprising a front bottom part (2) and a rear bottom part (14), the front bottom part (2) and the rear bottom part (14) being connected to each other at a bottom angle less than 180°, the rear bottom part (14) ending in an opening (16) and accordingly leaning in relation to the front bottom part (2), as well as that a front end portion (21) in addition is connected to the front edge of the front bottom part (2) in order to limit the loading space of the dumper body in the forward direction, an intermediate part (19) being placed internally in the dumper body (1) between and on top of the front bottom part (2) and the rear bottom part (14) at a deviating bottom angle in relation to both the front bottom part (2) and the rear bottom part (14) in such a way that a hollow space (H2) is formed between the front bottom part (2), the rear bottom part (14) and the intermediate part (19).

12 Claims, 1 Drawing Sheet

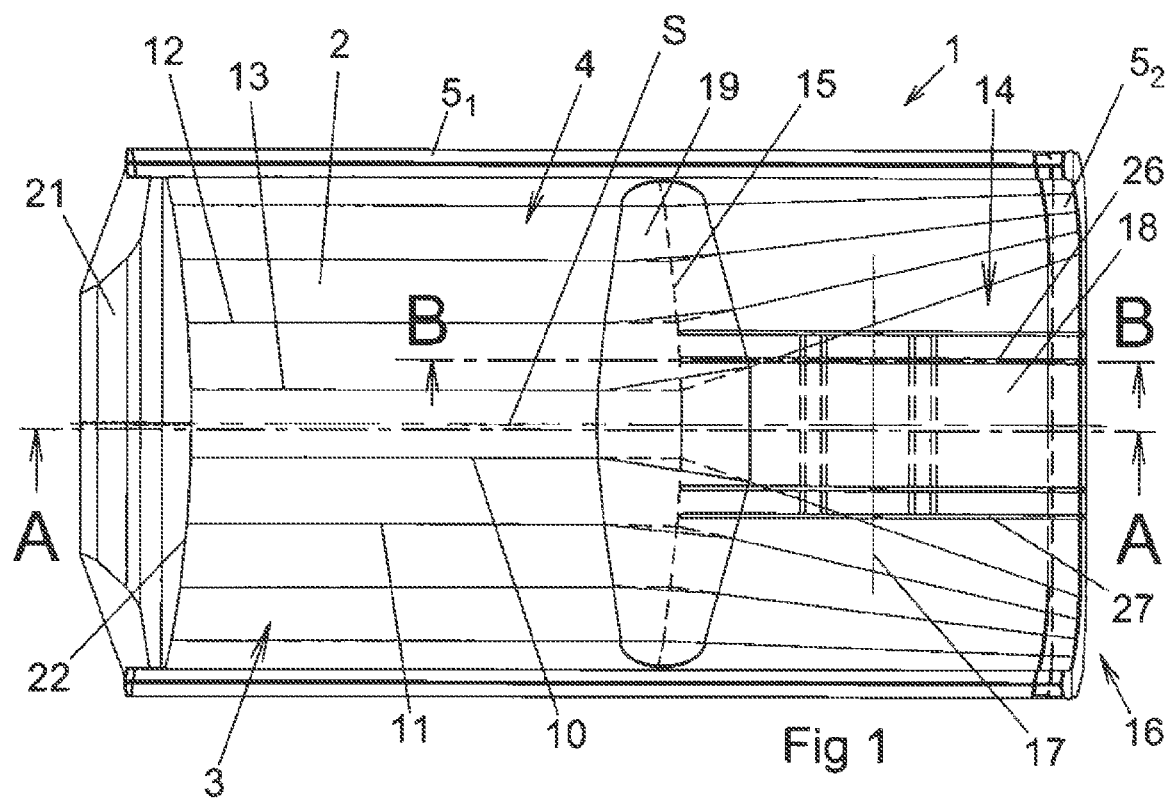
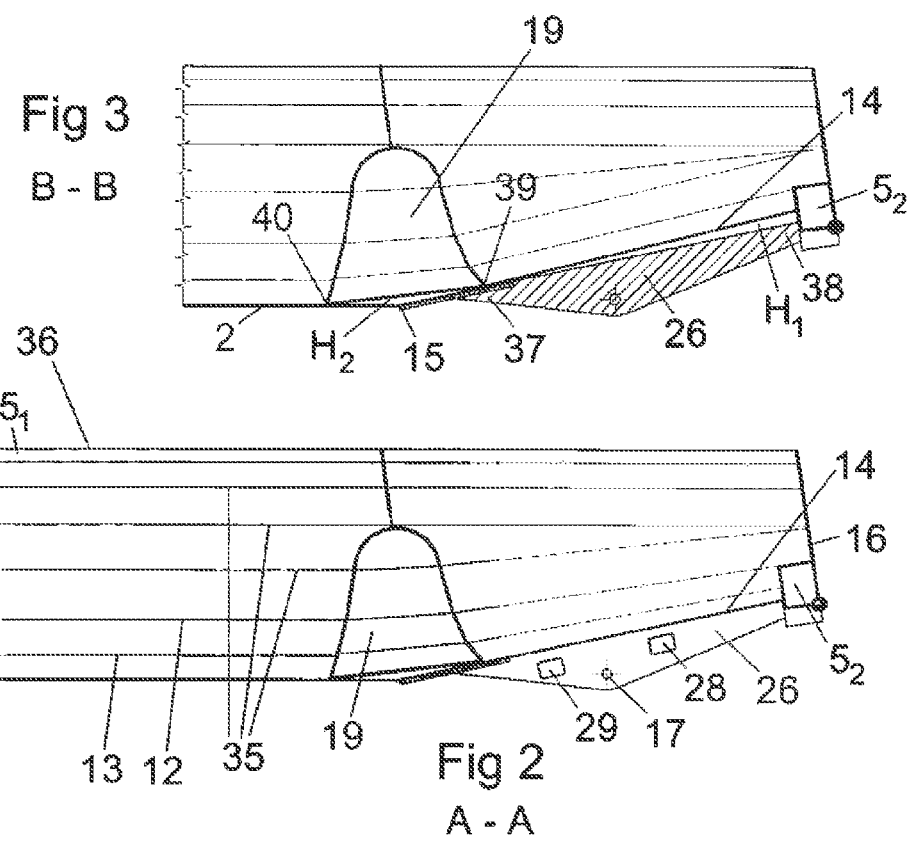

DUMPER BODY

This application is the U.S. national phase of International Application No. PCT/SE2009/051332, filed 25 Nov. 2009, which designated the U.S. and claims priority to Swedish Application No. 0850095-1, filed 25 Nov. 2008, the entire contents of each of which are hereby incorporated by reference.

TECHNICAL FIELD

The present invention relates to the area of lorries or trucks for heavier transportations such as tipping trucks and frame-steered dumpers for the transportation of, e.g., stone or rock masses in above all road constructions and other construction works.

BACKGROUND OF THE INVENTION

Dumper bodies are subjected to great forces in the form of dynamic and static loads above all upon loading but also during transportation and upon unloading. The dynamic load causes deformation of the dumper body in the form of elastic deflection and plastic deformation upon impact stresses. Accordingly, dumper bodies are constructed for these stresses and may weigh between 3 000-4 000 kg. Conventionally, dumper bodies have been manufactured of plane sheet-metal parts that have been welded together in order to provide the completed dumper body. This way to manufacture a dumper body involves many welds, which implies a weakening of the construction. Further development of these existing dumper bodies has entailed that the sheet-metal parts have been made larger, whereby the number of welds has been decreased with a greater strength as a result. In addition, the sheet-metal parts have been bent in order to further reduce the number of welds.

Dumper bodies have furthermore been formed with a rear part, a so-called chute, which has the purpose of facilitating tipping of the charge by the fact that the bottom surface of the dumper body in the lowered position by this rear part leans upward. This rear part is welded directly to the bottom part, whereby the joint between the bottom part and the rear part gets a lower strength than the rest of the bottom surface. However, this weakness can be minimized by providing the rear part of the dumper body with externally placed cross beams for the purpose of stiffening. However, by such a design an increase in weight is obtained that directly reflects in increased fuel consumption and smaller carrying capacity at an unaltered engine size.

THE OBJECT OF THE INVENTION

The present invention aims at providing an improved dumper body having the same good function as previously known dumper bodies but with a reduced weight and thereby a greater carrying ability.

A further object of the invention is to obtain portions in the dumper body having an elastically resilient function in order to increase the strength of adjacent welded joints.

SUMMARY OF THE INVENTION

By the present invention, such as the same is defined in the independent claims, the above-mentioned objects are met. Suitable embodiments of the invention are defined in the dependent claims.

The invention concerns a dumper body comprising a front bottom part and a rear bottom part, also called "chute" or in this invention "large chute". The front bottom part is formed of a first plane sheet-metal plate that is provided with a number of longitudinally made bendings.

The plate thickness is in the range of 3-16 mm, preferably 8 mm, of material grades that correspond to wearing plates marketed under the trademark HARDOX®. For instance, the wearing plate HARDOX® 450 of the thickness 3,2 mm may be used for the lighter dumper bodies. For a dumper body in the most common use, a wearing plate of HARDOX® 450 with a thickness of 8 mm is suitable, which gives a weight of the dumper body of 2 800 kg. Other feasible material grades are HARDOX® 400, HARDOX® 500, HARDOX® 550 and HARDOX® 600 for the application for sheet-metal components in a dumper body. Also other steel grades may of course be used for the manufacture of a dumper body according to the invention. HARDOX® is a registered trademark that is owned by SSAB Oxelösund AB.

Naturally, the dumper body may be manufactured with a bottom of thicker sheet-metal plate than its sides. The bendings are made by a roller-bending machine or by an edging press with two, three or four bendings in order to provide a 90° angular deformation of the sheet-metal plate. The front bottom part comprises as well as transforms into side parts either continuously or by a welding seam. Furthermore, in feasible embodiments, two symmetrical dumper body parts may be joined to a uniform dumper body by a centrally situated welding seam that has been placed at a distance from the bendings where the stresses in the material are lower.

The sheet-metal plate between each bending is plane. The same may also be curved between the bendings. The rear bottom part is formed of a second plane sheet-metal plate that is provided with the corresponding number of longitudinally made bendings. Also the second sheet-metal plate is plane or curved between each bending.

The invention concerns a dumper body having a front bottom part and a rear bottom part, the front bottom part and the rear bottom part being connected to each other at a bottom angle less than 180°. The rear bottom part ends in an opening and leans accordingly in relation to the front bottom part. A front end portion is in addition connected to the front edge of the front bottom part in order to limit the loading space of the dumper body in the forward direction. Furthermore, an intermediate part is placed internally in the dumper body between and on top of the front bottom part and the rear bottom part at a deviating bottom angle in relation to both the front bottom part and the rear bottom part in such a way that a hollow space is formed between the front bottom part, the rear bottom part and the intermediate part.

According to one embodiment of the invention, the dumper body comprises a front bottom part and a rear bottom part, the front bottom part being formed with a number of essentially longitudinally extending bendings. The front bottom part between each bending is essentially plane, as well as that the rear bottom part is formed with the corresponding number of essentially longitudinally extending bendings. The rear bottom part between each bending is also essentially plane, the front bottom part and the rear bottom part being connected to each other at a bottom angle that is smaller than 180°, the rear bottom part ending in an opening. The rear bottom part also leans in relation to the front bottom part. A front end portion is in addition connected to the front edge of the front bottom part in order to limit the loading space of the dumper body in the forward direction. Furthermore, an intermediate part is placed internally in the dumper body between and on top of the front bottom part and the rear bottom part. The intermediate part is connected at a deviating bottom angle in relation to both the front bottom part and the rear bottom part in such a way that a hollow space is formed between the front bottom part, the rear bottom part and the intermediate part.

One embodiment according to the invention is that the intermediate part is connected to both the front bottom part and the rear bottom part by a welded joint. Also the front bottom part is connected to the rear bottom part by a welded joint. Welded joints in the manufacture of dumper bodies mean an increase of weight of the completed body by the fact that the welded joints previously have been many. By combining bending with welding only at these spots, the number of welding seams and thereby the weight are minimized.

One embodiment according to the invention is that the intermediate part is formed with the corresponding bendings in the longitudinal direction in correspondence with the bendings of the front bottom part as well as with the bendings of the rear bottom part. Hereby, a homogeneous loading plane all through the dumper body is obtained.

One embodiment according to the invention is that the intermediate part between the bendings is plane. This means that flexibility between the bendings is obtained.

One embodiment according to the invention is that the bendings of the bottom part are essentially parallel to each other. This means that the loading stresses can be distributed symmetrically in the dumper body.

One embodiment according to the invention is that the bendings of the intermediate part are essentially parallel to each other. This contributes also to a symmetrical distribution of the loading stresses.

One embodiment according to the invention is that the edge of the opening of the dumper body is formed with a reinforcing beam extending around the opening. In order to obtain a very strong opening at the rear end of the dumper body, this reinforcing beam constitutes an optimization of the strength in relation to the weight.

One embodiment according to the invention is that longitudinal supporting beams are connected in the ends thereof to the underside of the rear bottom part in such a way that a second hollow space is formed between the respective beam and the underside of the rear bottom part. This design means a further possibility of a weight optimization by the central intermediate portions of the rear bottom part being allowed to flex in the space toward the supporting beams. Thereby, the bottom plate can be made thinner.

One embodiment according to the invention is that the supporting beams are formed as two double beams that extend from the connection between the front bottom part and the rear bottom part to a reinforcing beam extending around the opening. It is advantageous to spread the flexing capability over a larger plane bottom surface in the rear area of the dumper body in order to minimize the stresses upon tipping.

One embodiment according to the invention is that the supporting beams are connected to each other by at least two cross beams being orientated perpendicularly to the supporting beams. In order to stiffen the supporting beams, said cross beams are placed centrally at the central plane bottom portion of the rear bottom part.

One embodiment according to the invention is that a tipping axle for the tipping of the dumper body is placed through said supporting beams. By the placement of the tipping axle through the supporting beams, a weight-optimized tipping function is obtained that does not contribute to the stress propagation in the dumper body.

The plate thickness of the intermediate part may be greater than the plate thickness of the bottom part, e.g., 10 mm compared to 8 mm. A reinforcing plate with a thickness of 15 mm may be located on the underside of the dumper body in the area of the connection between either the bottom part and the intermediate part or the intermediate part and the rear part.

One advantageous embodiment is that the intermediate part is formed of a third sheet-metal plate provided with the corresponding number of or fewer bendings in the longitudinal direction.

One additional embodiment within the scope of the application is that the edge of the opening of the dumper body not only rearward but also upward is formed with an enclosing reinforcing beam.

Manufacture of a dumper body is carried out by,
- a plane bottom part being bent to form the sides and bottom of the dumper body,
- a plane front part being connected to the bottom part to form front end wall,
- a plane intermediate part being bent with bendings corresponding to the bottom part and being connected to the bottom part,
- a plane rear part being bent with bendings corresponding to the intermediate part and possibly to the bottom part and being connected to the intermediate part and possibly to the bottom part, wherein said connections are made by welded joints.

The manufacture of the dumper body may also comprise that the upper edge of the sheet-metal parts that form the opening of the dumper body is bent into a reinforcing beam preferably before the joining of the parts whereupon the parts and thereby the beams are welded together with each other.

Furthermore, a hinge is connected for the tipping to the underside of the rear part by a welded joint, and the bottom part of the dumper body is in addition provided with a connection for hydraulic regulation of the same. The plate thickness of these parts of the dumper body is approx. 20 mm.

A liner sheet is connected internally to the bottom of the dumper body as reinforcement during transportation of blasted rock. To the dumper body, a wear protection that is manufactured of perforated sheet-metal plates and functions as soil pockets may furthermore be connected.

All welded joints in the dumper body are placed in zones of the body that have low tension stresses statically as well as dynamically.

BRIEF DESCRIPTION OF THE DRAWINGS

The invention will now be described in more detail by means of embodiment examples, reference being made to the accompanying drawings, wherein FIG. 1 shows a top view of a dumper body according to the invention, FIG. 2 shows a section A-A through the dumper body according to FIG. 1, FIG. 3 shows a section B-B through the dumper body according to FIG. 1.

DESCRIPTION OF THE INVENTION

FIG. 1 shows a view from above of a dumper body 1 that is manufactured of plane plate sections and formed with a front bottom part 2 integrated with side parts 3, 4 that are terminated at the top by a first part of a reinforcing beam $5_1$. As is seen in the figure, the bottom part 2 is symmetrically formed on both sides of a symmetry line S through a number of bendings 10, 11, 12, 13. By each bending, a stiffening effect of the sheet-metal plate is provided at the same time as weakenings in an otherwise made welding seam are avoided. The front bottom part 2 may be welded to the side parts but may alternatively consist of the same plate section. The dumper body 1 is furthermore built up by a rear bottom part 14 connected to the front bottom part 2 along a welding seam 15. The placement of said welding seam is also seen in FIG. 3. The dumper body has an opening 16 in the rearward direction through which the dumper body is emptied when it, by means of hydraulics, is tipped around a tipping axle 17. The opening 16 is reinforced by a second part of the reinforcing beam $5_2$ that is formed as a rectangular pipe section. The rear bottom part 14 has a central plane bottom portion 18 the width of which increases toward the opening 16. Furthermore, an intermediate part 19 is placed internally in the dumper body over the welding seam 15 in the area between the front bottom part 2 and the rear bottom part 14. Supporting beams 26, 27 are placed under the rear bottom part 14 and are formed as two beams having a double section each. In addition, the front bottom part 2 is connected to a front end portion 21 that limits the loading space of the dumper body in the forward direction. The end portion 21 is connected to the front bottom part 2 by a welding seam 22.

FIG. 2 shows a section through the dumper body wherein the second part of the placement of the reinforcing beam $5_2$ at the opening 16 is seen. The shown cross-section of the beam 5 is rectangular, but also other shapes and placements in relation to the opening 16 and the rear bottom part 14 are feasible. For instance, other shapes of closed beams than rectangular may be feasible. Furthermore, open shapes of beams formed with two or three bendings may be conceivable. Also any shape of these feasible open beams is comprised in the present patent application as a "reinforcing beam". In the shown section, also a supporting beam 26 is seen that is placed longitudinally under the rear bottom part 14. The supporting beam is fitted parallel to a second supporting beam, two cross beams 28, 29 fixing this supporting system of beams. The cross beams 28, 29 are parallel to each other and placed so that a distance is formed between the same and the underside of the rear bottom part 14. Through the supporting beams 26, 27 (FIG. 1), the tipping axle 17 extends. The figure also shows the intermediate part 19 that extends up toward the side portion 4 of the front bottom part 2. Also two of the bendings 12, 13 of the front bottom part 2 have been marked in the figure. In the connection between the end portion 21 and the front bottom part 2, there is a reinforcing plate 32 connected to act as a force distributor in this welded corner between the front bottom part 2 and the end portion 21. In the front edge thereof, the dumper body rests on rubber elements (not shown), which rest directly against the reinforcing plate 32. Furthermore, a plurality of bendings 35 are shown that may be assigned to the side part 4, but the border between the front bottom part 2 and the side part 4 can be placed optionally. Neither, there has to be a border between these parts, but the front bottom part 2 may extend all the way up to the upper edge 36 of the dumper body where the first part of the reinforcing beam $5_1$ is placed. The corresponding division applies to the rear bottom part 14.

FIG. 3 shows a section taken through a supporting beam 26, the supporting beam, in the front end 37 thereof, at the welding seam 15, being connected to the underside of the rear bottom part 14 and in the rear end 38 thereof being connected to the second part of the reinforcing beam $5_2$ at a distance from the underside of the rear bottom part 14. In this way, a first hollow space $H_1$ is formed between the underside of the rear bottom part 14 and the supporting beam 26. This hollow space allows a limited elastic deflection of the underside of the rear bottom part 14 toward the supporting beam 26. Furthermore, the figure shows that the rear bottom part 14 is joined to the underside of the front bottom part 2 at the welding seam 15. In addition, the intermediate part 19 is connected to the rear bottom part 14 via a welding seam 39 and to the front bottom part 2 via a welding seam 40. By this interior fitting of the intermediate part, a second hollow space $H_2$ is obtained between the top side of the rear bottom part 14, the top side of the front bottom part 2 and the underside of the intermediate part 19. Also this hollow space allows a limited elastic deflection of the underside of the intermediate part.

A number of additional embodiments can be assumed to be suitable within the scope of the subsequent claims, wherein the present invention should not be considered to be limited only to the embodiment described above.

The invention claimed is:
1. A dumper body comprising:
a front bottom part,
a rear bottom part, and
an intermediate part,
the front bottom part and the rear bottom part being connected to each other by a welding seam at a bottom angle of less than 180°,
the rear bottom part ending in an opening and accordingly leaning in relation to the front bottom part, as well as that a front end portion in addition is connected to the front edge of the front bottom part in order to limit the loading space of the dumper body in the forward direction,
the intermediate part being placed internally in the dumper body between and on top of the front bottom part and the rear bottom part over and extending along the welding seam, transversely across the bottom parts, at a deviating bottom angle in relation to both the front bottom part and the rear bottom part in such a way that a hollow space is formed between the front bottom part, the rear bottom part and the intermediate part.

2. The dumper body according to claim 1, wherein the intermediate part is connected to both the front bottom part and the rear bottom part by welded joints.

3. The dumper body according to claim 1, wherein the front bottom part is formed with a number of essentially longitudinally extending bendings, the front bottom part between each bending being essentially plane, as well as that the rear bottom part is formed with the corresponding number of essentially longitudinally extending bendings, the rear bottom part between each bending also being essentially plane.

4. A dumper body comprising:
a front bottom part,
a rear bottom part, and
an intermediate part,
the front bottom part the rear bottom part being connected to each other by a welding seam at a bottom angle of less than 180°,
the rear bottom part ending in an opening and accordingly leaning in relation to the front bottom part, as well as that a front end portion in addition is connected to the front edge of the front bottom part in order to limit the loading space of the dumper body in the forward direction,
the intermediate part being placed internally in the dumper body between and on top of the front bottom part and the rear bottom part over and extending along the welding seam at a deviating bottom angle in relation to both the front bottom part and the rear bottom part in such a way that a hollow space is formed between the front bottom part, the rear bottom part and the intermediate part,
the front bottom part is formed with a number of essentially longitudinally extending bendings, the front bottom part between each bending being essentially plane, as well as that the rear bottom part is formed with the corresponding number of essentially longitudinally extending bendings, the rear bottom part between each bending also being essentially plane, the intermediate part being formed with corresponding longitudinally extending bendings in correspondence with the bendings of the front bottom part and the bendings of the rear bottom part.

5. A dumper body comprising:

a front bottom part, a rear bottom part, and an intermediate part, the front bottom part and the rear bottom part being connected to each other by a welding seam at a bottom angle of less than 180°, the rear bottom part ending in an opening and accordingly leaning in relation to the front bottom part, as well as that a front end portion in addition is connected to the front edge of the front bottom part in order to limit the loading space of the dumper body in the forward direction, the intermediate part being placed internally in the dumper body between and on top of the front bottom part and the rear bottom part over and extending along the welding seam at a deviating bottom angle in relation to both the front bottom part and the rear bottom part in such a way that a hollow space is formed between the front bottom part, the rear bottom part and the intermediate part, the front bottom part is formed with a number of essentially longitudinally extending bendings, the front bottom part between each bending being essentially plane, as well as that the rear bottom part is formed with the corresponding number of essentially longitudinally extending bendings, the rear bottom part between each bending also being essentially plane, the intermediate part being plane between the bendings corresponding to the intermediate part.

6. The dumper body according to claim 3, wherein the bendings of the front bottom part are essentially parallel to each other.

7. The dumper body according to claim 5, wherein part of the bendings forming the intermediate part are essentially parallel to each other.

8. The dumper body according to claim 1, wherein the edge of the opening of the dumper body is formed with a reinforcing beam extending around the opening.

9. The dumper body according to claim 1, wherein longitudinal supporting beams are connected in the ends thereof to the underside of the rear bottom part in such a way that a hollow space is formed between the respective beam and the underside of the rear bottom part.

10. The dumper body according to claim 9, wherein the supporting beams are two beams that extend from the connection between the front bottom part and the rear bottom part to a reinforcing beam extending around the opening, each supporting beam formed from a double section.

11. The dumper body according to claim 9, wherein the supporting beams are connected to each other by at least two cross beams orientated perpendicularly to the supporting beams.

12. The dumper body according to claim 9, wherein a tipping axle for the tipping of the dumper body is placed through said supporting beams.

* * * * *